(12) United States Patent
Fujiwara et al.

(10) Patent No.: US 11,839,940 B2
(45) Date of Patent: Dec. 12, 2023

(54) JOINING STRUCTURE

(71) Applicant: Panasonic Intellectual Property Management Co., Ltd., Osaka (JP)

(72) Inventors: Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 77 days.

(21) Appl. No.: 17/464,574

(22) Filed: Sep. 1, 2021

(65) Prior Publication Data

US 2021/0394295 A1    Dec. 23, 2021

Related U.S. Application Data

(63) Continuation of application No. PCT/JP2020/015777, filed on Apr. 8, 2020.

(30) Foreign Application Priority Data

Apr. 19, 2019    (JP) .................................. 2019-080113

(51) Int. Cl.
*B23K 9/23*  (2006.01)
*B23K 9/007*  (2006.01)
(Continued)

(52) U.S. Cl.
CPC .............. *B23K 9/232* (2013.01); *B23K 9/007* (2013.01); *B23K 9/235* (2013.01); *B23K 33/002* (2013.01);
(Continued)

(58) Field of Classification Search
CPC ........ B23K 9/232; B23K 9/007; B23K 9/235; B23K 33/002; B23K 2101/18;
(Continued)

(56) References Cited

U.S. PATENT DOCUMENTS 2,790,656 A * 4/1957 Cook ..................... B23K 9/232
428/673
3,287,540 A * 11/1966 Connelly ........... B23K 35/3603
228/208

(Continued)

FOREIGN PATENT DOCUMENTS

CN    1668414    9/2005
CN    109562474    4/2019
(Continued)

OTHER PUBLICATIONS

English Translation of Chinese Search Report dated Jul. 20, 2022 for the related Chinese Patent Application No. 202080028493.3
(Continued)

*Primary Examiner* — Lawrence Averick
(74) *Attorney, Agent, or Firm* — Wenderoth, Lind & Ponack, L.L.P.

(57) ABSTRACT

Second member 20 includes a material that is difficult to weld to first member 10. In first member 10, recess 11 is formed by press molding such that a lower surface of first member 10 opposite to second member 20 protrudes. Third member 30 is arc-welded toward at least a bottom of recess 11 via penetrating part 21 of second member 20. Second member 20 is compressed by flange 31 and first member 10 by solidification contraction of third member 30, and second member 20 is therefore fixed between flange 31 of third member 30 and first member 10.

15 Claims, 13 Drawing Sheets

(51) Int. Cl.
   *F16B 5/08* (2006.01)
   *B23K 9/235* (2006.01)
   *B23K 33/00* (2006.01)
   B23K 103/18 (2006.01)
   B23K 101/18 (2006.01)

(52) U.S. Cl.
   CPC ............ *F16B 5/08* (2013.01); *B23K 2101/18* (2018.08); *B23K 2103/18* (2018.08)

(58) Field of Classification Search
   CPC ............... B23K 2103/18; B23K 9/173; B23K 2103/20; B23K 9/23; B23K 33/00; F16B 5/08; B29C 65/562; B29C 65/64; B29C 66/1122; B29C 66/21; B29C 66/41; B29C 66/71; B29C 66/7212; B29C 66/742; B29C 66/74283
   See application file for complete search history.

(56) References Cited

U.S. PATENT DOCUMENTS

| | | | | |
|---|---|---|---|---|
| 3,465,420 | A * | 9/1969 | Webb | C04B 28/26 228/229 |
| 4,030,849 | A * | 6/1977 | Keifert | F16B 5/08 403/272 |
| 4,939,338 | A * | 7/1990 | Bregy | B23K 9/232 219/137 WM |
| 6,450,393 | B1 * | 9/2002 | Doumanidis | B29C 66/80 228/160 |
| 6,552,292 | B1 | 4/2003 | Nomura et al. | |
| 7,150,391 | B2 * | 12/2006 | Fujimoto | B23K 9/0026 219/121.64 |
| 9,085,122 | B2 * | 7/2015 | Ohhama | B32B 15/043 |
| 9,796,583 | B2 * | 10/2017 | Coppeta | H01L 23/10 |
| 10,076,799 | B2 * | 9/2018 | Kaitoku | B23K 1/0056 |
| 10,384,316 | B2 * | 8/2019 | Goncharov | C22C 19/056 |
| 10,500,672 | B2 * | 12/2019 | Bush | B23K 9/232 |
| 10,543,570 | B2 * | 1/2020 | Argentine | B23K 9/167 |
| 10,778,074 | B2 * | 9/2020 | Kuroda | H02K 33/00 |
| 10,850,342 | B2 * | 12/2020 | Inoue | B23K 9/232 |
| 10,870,166 | B2 * | 12/2020 | Hahnlen | B32B 15/012 |
| 11,465,226 | B2 * | 10/2022 | Bush | B23K 9/232 |
| 2005/0127044 | A1 | 6/2005 | Nozue et al. | |
| 2005/0152741 | A1 * | 7/2005 | Fujimoto | B23K 26/28 219/121.64 |
| 2012/0241216 | A1 * | 9/2012 | Coppeta | F16B 4/004 228/115 |
| 2014/0248508 | A1 * | 9/2014 | Ohhama | B23K 20/16 428/638 |
| 2016/0221106 | A1 * | 8/2016 | Bush | B23K 9/232 |
| 2016/0297020 | A1 * | 10/2016 | Kaitoku | B23K 1/19 |
| 2017/0100804 | A1 * | 4/2017 | Goncharov | C22F 1/10 |
| 2017/0141664 | A1 * | 5/2017 | Kuroda | H02K 5/04 |
| 2017/0239760 | A1 * | 8/2017 | Argentine | F16B 5/08 |
| 2017/0274479 | A1 * | 9/2017 | Katoh | B23K 9/232 |
| 2018/0045232 | A1 * | 2/2018 | Capostagno | B23K 26/22 |
| 2018/0254690 | A9 * | 9/2018 | Kuroda | B06B 1/045 |
| 2019/0099966 | A1 * | 4/2019 | Hahnlen | B29C 70/68 |
| 2019/0101145 | A1 | 4/2019 | Fujiwara et al. | |
| 2019/0232419 | A1 * | 8/2019 | Hahnlen | B32B 15/20 |
| 2019/0257333 | A1 | 8/2019 | Fujiwara et al. | |
| 2019/0275604 | A1 * | 9/2019 | Bush | B23K 9/24 |
| 2020/0009676 | A1 * | 1/2020 | Inoue | B23K 9/0203 |

FOREIGN PATENT DOCUMENTS

| | | |
|---|---|---|
| JP | 2003-25094 | 1/2003 |
| JP | 2009-226446 | 10/2009 |
| JP | 2010-227956 | 10/2010 |
| JP | 2013-150998 | 8/2013 |
| WO | 2005/000516 | 1/2005 |
| WO | 2017/170213 | 10/2017 |
| WO | 2018/030272 | 2/2018 |

OTHER PUBLICATIONS

International Search Report of PCT application No. PCT/JP2020/015777 dated Jun. 30, 2020.
Indian Office Action dated May 10, 2023 in corresponding Indian Patent Application No. 202147045900, with English translation.

* cited by examiner

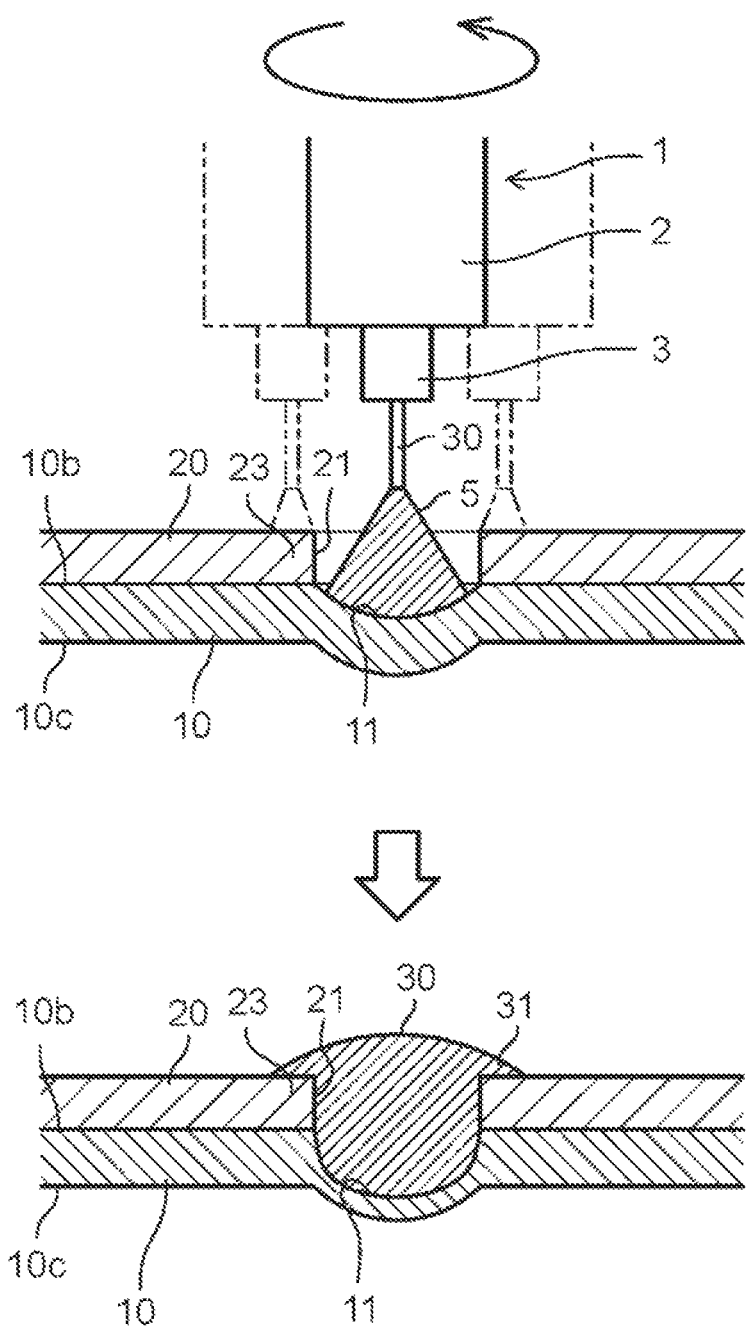

JOINING STRUCTURE

This application is a continuation of the PCT International Application No. PCT/JP2020/015777 filed on Apr. 8, 2020, which claim the benefit of foreign priority of Japanese patent application No. 2019-080113 filed on Apr. 19, 2019, the contents all of which are incorporated herein by reference.

TECHNICAL FIELD

The present invention relates to a joining structure.

BACKGROUND ART

PTL 1 discloses a joining structure in which a first metal material and a dissimilar material that is difficult to weld to the first metal material are overlapped with each other, and a filler material (welding wire) is arc-welded via a penetrating part of the dissimilar material.

At this time, a flange is formed from the melted filler material so as to cover an outer periphery on an upper surface of the penetrating part of the dissimilar material. As a result, the dissimilar material and the first metal material are fixed by a compression fixing force between the flange and the first metal material by solidification contraction of the filler material with respect to the first metal material.

CITATION LIST

Patent Literature

PTL 1: International Publication No. 2018/030272

SUMMARY OF THE INVENTION

Technical problem

In the invention disclosed in PTL 1, for example, when a hole diameter of the penetrating part is small, a welding area of the filler material in the first metal material is also small, and there is a possibility that joining strength may be insufficient.

The present invention has been made in view of such a point, and an object of the present invention is to increase a welding area of a filler material to secure joining strength.

Solution to Problem

The present invention is directed to a joining structure joining, to each other, a first member including a metal material, a second member including a material that is difficult to weld to the first member, and a third member including a filler material welded to the first member, and the following solution is achieved.

That is, in a first aspect of the present invention, the first member includes a recess formed by press molding and has a lower surface opposite to the second member, the lower surface being configured to protrude. The second member includes a penetrating part that opens at a position corresponding to the recess. The third member includes a flange that presses a peripheral edge of the penetrating part, and is arc-welded toward at least a bottom of the recess via the penetrating part. The second member is compressed by the flange and the first member by solidification contraction of the third member, and the second member is therefore fixed between the flange of the third member and the first member.

In the first aspect of the present invention, the second member includes a material that is difficult to weld to the first member. The first member is provided with the recess formed by press molding. The third member is welded to the recess via the penetrating part of the second member. The second member is fixed between the flange of the third member and the first member by solidification contraction of the third member.

As described above, the first member is provided with the recess by press molding, and the third member is arc welded toward at least the bottom of the recess. Thus, the welding area of the third member can be increased as compared with when the third member is welded to a flat surface of the first member. This can secure joining strength between the first member, the second member, and the third member.

In a second aspect of the present invention, according to the first aspect of the present invention, the flange protrudes radially outward from the penetrating part on a surface of the second member opposite to the first member.

In the second aspect of the present invention, the second member can be fixed between the flange and the first member by pressing a surface of the second member opposite to the first member by the flange.

In a third aspect of the present invention, according to the first aspect, the penetrating part is defined by the peripheral edge. The peripheral edge includes a tapered part tapered toward the first member. The flange presses the tapered part.

In the third aspect of the present invention, the tapered part provided in the peripheral edge allows the filler material having been melted to easily flow toward the recess. Further, the flange formed in a shape along the tapered part can suppress a thickness of the flange protruding from the second member.

In a fourth aspect of the present invention, according to any one of the first to third aspects of the present invention, the recess includes a bottom having a flat shape and an inclined part inclined toward the bottom.

In the fourth aspect of the present invention, the inclined part provided in the recess allows the filler material having been melted to easily flow toward the bottom of the recess. In addition, the bottom of the recess having a flat shape can increase the welding area of the third member and secure the joining strength.

In a fifth aspect of the present invention, according to any one of the first to third aspects of the present invention, the recess has a tapered shape tapered toward the bottom of the recess.

In the fifth aspect of the present invention, the recess having a tapered shape tapered toward the bottom allows the filler material having been melted to easily flow toward the bottom of the recess.

In a sixth aspect of the present invention, according to any one of the first to third aspects of the present invention, the recess has a tapered shape that widens toward the bottom of the recess.

In the sixth aspect of the present invention, the recess has a tapered shape that widens toward the bottom. As a result, when the filler material having been melted is solidified in a wide portion of the recess, the third member bites into the recess, and the joining strength can be increased.

In a seventh aspect of the present invention, in any one of the first to sixth aspects of the present invention, the recess includes a plurality of small recesses smaller than the recess.

In the seventh aspect of the present invention, by providing the plurality of small recesses, the filler material having been melted can be welded while being dispersed in the plurality of small recesses. Further, the third member bites into the plurality of small recesses, and thus a wedge effect can be obtained in the plurality of small recesses to improve joining stability.

In an eighth aspect of the present invention, according to any one of the first to seventh aspects of the present invention, the second member further includes a step that opens at a surface opposite to the first member. The penetrating part is disposed on a bottom surface of the step.

In the eighth aspect of the present invention, the penetrating part is disposed on the bottom surface of the step of the second member. Thus, the flange of the third member is disposed in the step, and thus the flange can be prevented from protruding from the second member.

In a ninth aspect of the present invention, according to the eighth aspect of the present invention, the bottom surface of the step is inclined toward the penetrating part.

In the ninth aspect of the present invention, the bottom surface of the step inclined toward the penetrating part allows the filler material having been melted to easily flow toward the penetrating part.

In a tenth aspect of the present invention, according to any one of the first to ninth aspects of the present invention, the third member includes a first joint welded to the first member and a second joint welded to the first joint and constituting the flange.

In the tenth aspect of the present invention, the third member formed separately into the first joint and the second joint allows selective use of a welding method or welding condition in consideration of material characteristics of the second member.

For example, when the filler material having been melted is welded to the first member via the penetrating part, short-circuit welding in which spread of arc is small may be performed with heat input necessary for melting to form the first joint. Thereafter, pulse welding with positive polarity or alternating current in which the arc spreads largely may be performed with such a low heat input not to melt the second member to form the second joint. As a result, the flange can be formed while suppressing heat input amount to the second member.

In an eleventh aspect of the present invention, according to any one of the first to tenth aspects of the present invention, the second member has a melting point lower than a melting point of the first member and a thickness larger than a thickness of the first member.

In the eleventh aspect of the present invention, the thickness of the second member having a melting point lower than the melting point of the first member is larger than the thickness of the first member, and thus a relative heat capacity can be increased.

Specifically, when the thickness of the second member is small, the heat capacity is reduced, and heat generated by welding has fewer places to escape and is likely to accumulate. On the other hand, when the thickness of the second member is large, the heat capacity increases, and the heat has more places to escape and is less likely to accumulate. In this way, by increasing the thickness of the second member, the second member is less likely to burn through.

A twelfth aspect of the present invention relates to a joining structure including a first member, a second member, and a third member. The first member has an upper surface and a lower surface opposite the upper surface. The first member includes a recess including a concave formed in the upper surface and a protrusion formed in the lower surface. The first member includes a metal material. The second member includes a penetrating part that opens at a position corresponding to the recess, and a peripheral edge that defines the penetrating part. The second member includes a material that is difficult to weld to the first member. The second member is disposed on the upper surface of the first member. The third member includes a welded part arc-welded to an inner peripheral surface of the recess, and a flange connected to the welded part via the penetrating part and covers the peripheral edge. The third member includes a filler material welded to the first member. The second member is compressed by the flange and the first member by solidification compression of the third member, and the second member is therefore fixed between the flange and the first member.

As described above, the first member is provided with the recess, and the third member is arc welded toward at least the bottom of the recess. Thus, the welding area of the third member can be increased as compared with when the third member is welded to a flat surface of the first member. This can secure joining strength between the first member, the second member, and the third member.

A thirteenth aspect of the present invention relates to a joining method including preparation of a first member, preparation of a second member, and formation of a third member. The first member has an upper surface and a lower surface opposite the upper surface. The first member includes a metal material. The first member is provided with a recess including a concave formed in the upper surface and a protrusion formed in the lower surface by press molding. The second member includes a penetrating part and a peripheral edge defining the penetrating part. The second member includes a material that is difficult to weld to the first member. The second member is disposed on the upper surface of the first member such that the penetrating part is located corresponding to the recess. The third member is formed by arc welding toward at least a bottom of the recess via the penetrating part. The third member includes a filler material welded to the first member. The third member includes a flange that presses the peripheral edge. The second member is compressed by the flange and the first member by solidification contraction of the third member, and the second member is therefore fixed between the flange of the third member and the first member.

In the thirteenth aspect of the present invention, the second member includes a material that is difficult to weld to the first member. The first member is provided with the recess formed by press molding. The third member is welded to the recess via the penetrating part of the second member. The second member is fixed between the flange of the third member and the first member by solidification contraction of the third member.

As described above, the first member is provided with the recess by press molding, and the third member is arc welded toward at least the bottom of the recess. Thus, the welding area of the third member can be increased as compared with when the third member is welded to a flat surface of the first member. This can secure joining strength between the first member, the second member, and the third member.

ADVANTAGEOUS EFFECT OF INVENTION

In the present invention, the welding area of the filler material can be increased to secure the joining strength.

BRIEF DESCRIPTION OF DRAWINGS

FIG. 9 is a side sectional view for describing a joining structure according to an eighth exemplary embodiment.

DESCRIPTION OF EMBODIMENTS

Hereinafter, exemplary embodiments of the present invention will be described with reference to the drawings. Note that the following description of preferred exemplary embodiments is merely exemplary in nature, and is not intended to limit the present invention, its application, or its use.

First Exemplary Embodiment

Figure 1:
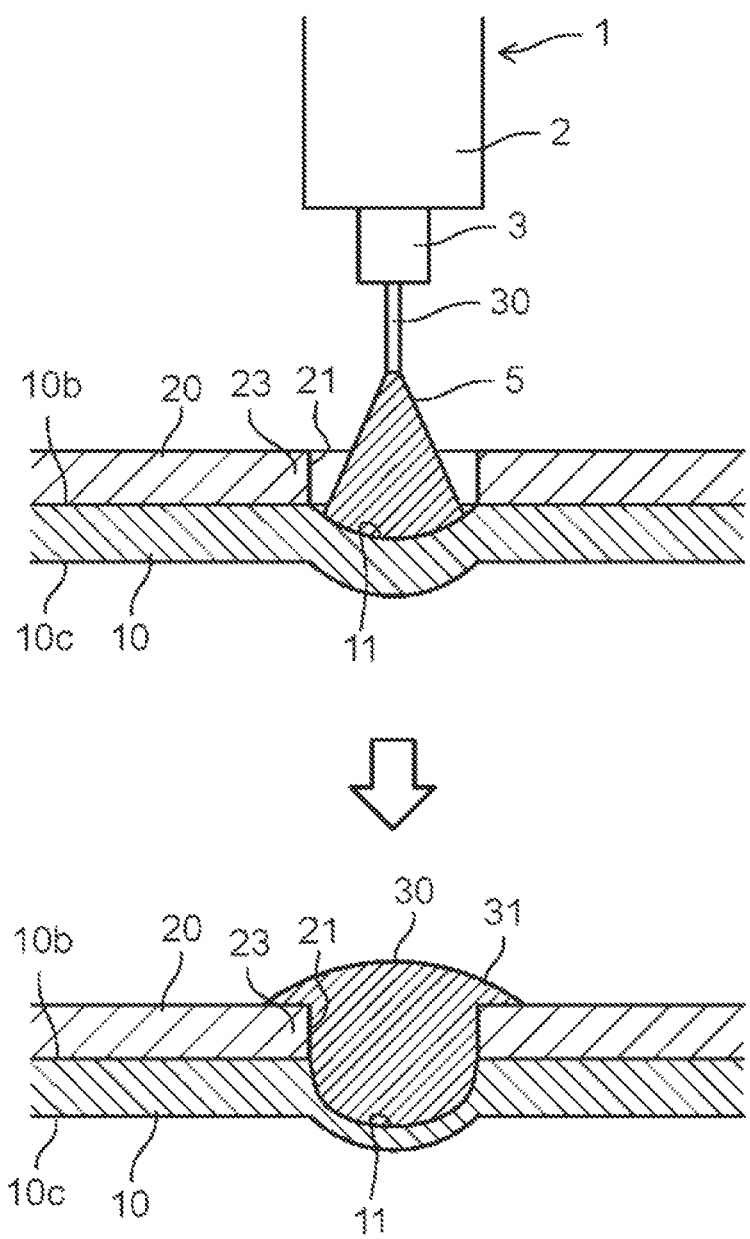
FIG. 1 is a side sectional view for describing a joining structure according to a first exemplary embodiment.

FIG. 1 illustrates a joining structure that joins first member 10 including a metal material, second member 20 including a material that is difficult to weld to first member 10, and third member 30 including a filler material to each other.

First member 10 is a member having a plate shape and including a metal material. First member 10 includes recess 11 formed by press molding. In an example illustrated in FIG. 1, recess 11 is recessed downward in a curved shape. First member 10 has upper surface 10b and lower surface 10c opposite to upper surface 10b. Upper surface 10b faces second member 20. Recess 11 is formed such that upper surface 10b is recessed and lower surface 10b protrudes.

Second member 20 is a member having a plate shape and including a material that is difficult to weld to first member 10. Second member 20 is overlapped on an upper side of first member 10. Second member 20 includes penetrating part 21 having a circular shape. Penetrating part 21 is opened at a position corresponding to recess 11 of first member 10. Second member 20 further includes peripheral edge 23 that defines penetrating part 21.

In the present exemplary embodiment, penetrating part 21 is described as a circular through hole, but may be an elliptical or elongated through hole. Penetrating part 21 may be a through groove. The through groove penetrates from an upper surface to a lower surface in a thickness direction of second member 20. The through groove is further opened at both ends or one end in a length direction of the through groove. In this respect, the through groove is different from an elongated through hole. The elongated through hole is closed at both ends in the length direction of the through hole. For example, when the through groove is opened at both ends in the length direction of the through groove, second member 20 includes at least two independent plates disposed on first member 10. The two plates are arranged with an elongated gap therebetween. This gap forms the through groove as the penetrating part.

In a case where second member 20 includes a plurality of independent plates and forms a plurality of through grooves, third member 30 as a molten filler material is welded to first member 10 via the plurality of through grooves, and then second member 20 is sandwiched between third member 30 and first member 10 to fix second member 20 to first member 10.

Third member 30 includes a filler material that is a metal material of a similar type to first member 10. Here, the metal materials of a similar type are metals that can be welded to each other, and are metal materials that join well by welding, such as iron-based metal materials and non-ferrous metal materials, in addition to the same materials. In other words, the metal materials of a similar type are materials having good compatibility in welding.

Specifically, examples of a combination of first member 10 and third member 30 at time of welding include the following. Examples of a combination of iron-based metal materials include mild steel and mild steel, stainless steel and stainless steel, mild steel and high-tensile strength steel, and high-tensile strength steel and high-tensile strength steel. Examples of a combination of nonferrous metal materials include aluminum and aluminum, aluminum and an aluminum alloy, and an aluminum alloy and an aluminum alloy.

Further, second member 20 as a dissimilar material includes a material different from the materials of first member 10 and third member 30 as metal materials of a similar type, and includes a material that is difficult to weld to first member 10 and third member 30.

For example, when first member 10 and third member 30 as metal materials of a similar type include an iron-based metal material, second member 20 as a dissimilar material is a non-ferrous metal material such as a copper material or an aluminum material. In addition, for example, a resin material such as carbon fiber reinforced plastics (CFRP) or polyethylene terephthalate (PET) is also exemplified as a dissimilar material to the metal material.

In the following description, a case where a soft steel material is used as first member 10, an aluminum material is used as second member 20, and a soft steel material is used as third member 30 serving as a filler material will be described.

Arc welder 1 includes nozzle 2 and tip 3. Nozzle 2 supplies shielding gas or the like to a welded portion of an object to be welded. Tip 3 supplies a welding current to third member 30.

Arc welder 1 generates arc 5 by supplying a welding current while feeding third member 30 to recess 11 via penetrating part 21. Arc 5 is irradiated toward at least a bottom of recess 11 of first member 10. Third member 30 melted by arc 5 is melt-bonded to recess 11 and layered in penetrating part 21. Then, after filling inside of penetrating part 21, third member 30 having been melted flows out to peripheral edge 23 on an upper surface of penetrating part 21 and spreads in a flange shape.

In a process in which third member 30 having been melted becomes bead, third member 30 is provided with flange 31 that presses peripheral edge 23 of penetrating part 21. Flange 31 protrudes radially outward from penetrating part 21 on a surface (upper surface in FIG. 1) of second member 20 opposite to first member 10.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, recess 11 is provided in first member 10 by press molding so as to protrude toward a rear surface (lower surface) of first member 10 opposite to second member 20, and third member 30 is welded entirely to recess 11 of first member 10 via penetrating part 21 of the second member. Thus, a welding area of third member 30 can be increased. As a result, joining strength between first member 10, second member 20, and third member 30 can be secured. Furthermore, even when a plate thickness of first member 10 is thin, mechanical strength is relatively improved by a structure of recess 11 protruding toward the lower surface (rear surface) of first member 10 opposite to second member 20, and strength of a joint of first member 10 can be improved. By welding third member 30 to recess 11 of first member 10 via penetrating part 21 of the second member, the joining strength between first member 10, second member 20, and third member 30 can be secured.

Second Exemplary Embodiment

Hereinafter, the same parts as those in the first exemplary embodiment will be denoted by the same reference marks, and only differences will be described.

Figure 2:
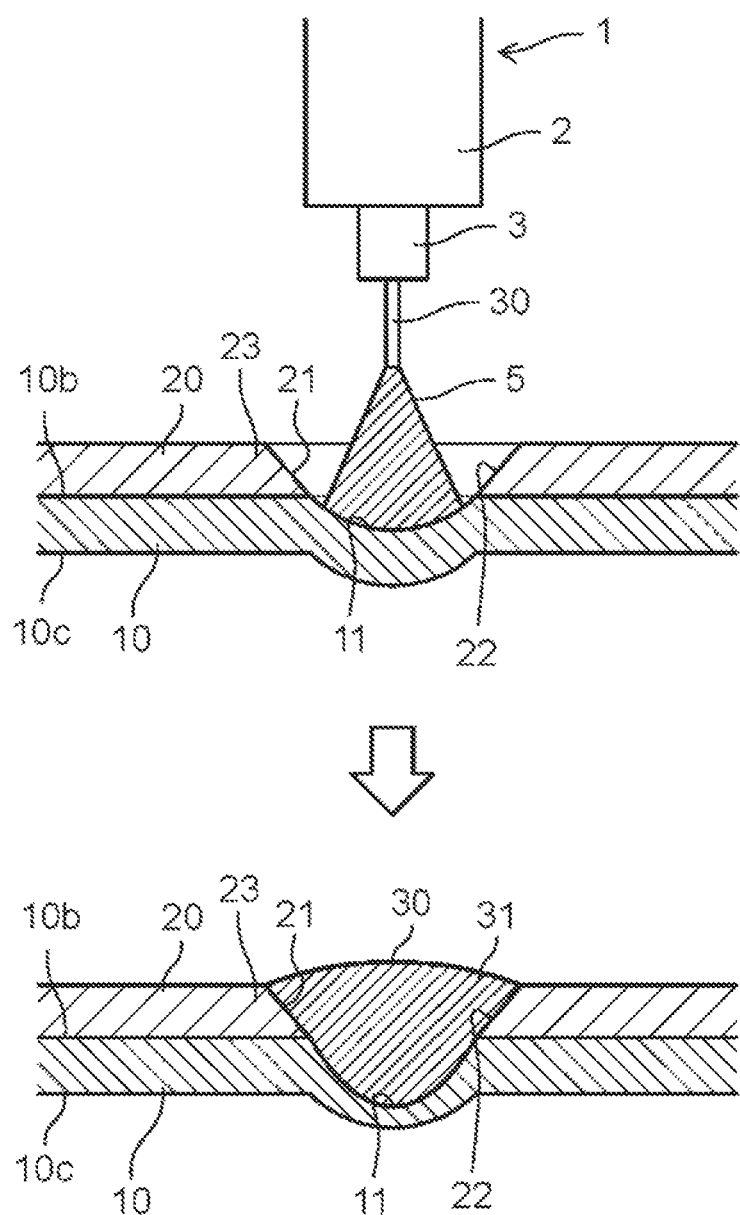
FIG. 2 is a side sectional view for describing a joining structure according to a second exemplary embodiment.

As illustrated in FIG. 2, first member 10 includes recess 11 formed by press molding. Recess 11 is recessed downward in a curved shape.

Second member 20 includes penetrating part 21 that opens at a position corresponding to recess 11 of first member 10. Penetrating part 21 is defined by peripheral edge 23. Peripheral edge 23 includes tapered part 22 tapered toward first member 10.

Third member 30 is melted by arc 5. Third member 30 having been melted flows toward recess 11 along tapered part 22 of penetrating part 21 and is melt-bonded to recess 11.

Third member 30 having been melted fills the inside of penetrating part 21 to spread in a flange shape on an upper surface of tapered part 22.

In a process in which third member 30 having been melted becomes bead, third member 30 is provided with flange 31 that presses tapered part 22.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, peripheral edge 23 is provided with tapered part 22, and thus third member 30 having been melted easily flows toward recess 11. Further, by forming flange 31 in a shape along tapered part 22, a thickness of flange 31 protruding from second member 20 can be suppressed.

Third Exemplary Embodiment

Figure 3:
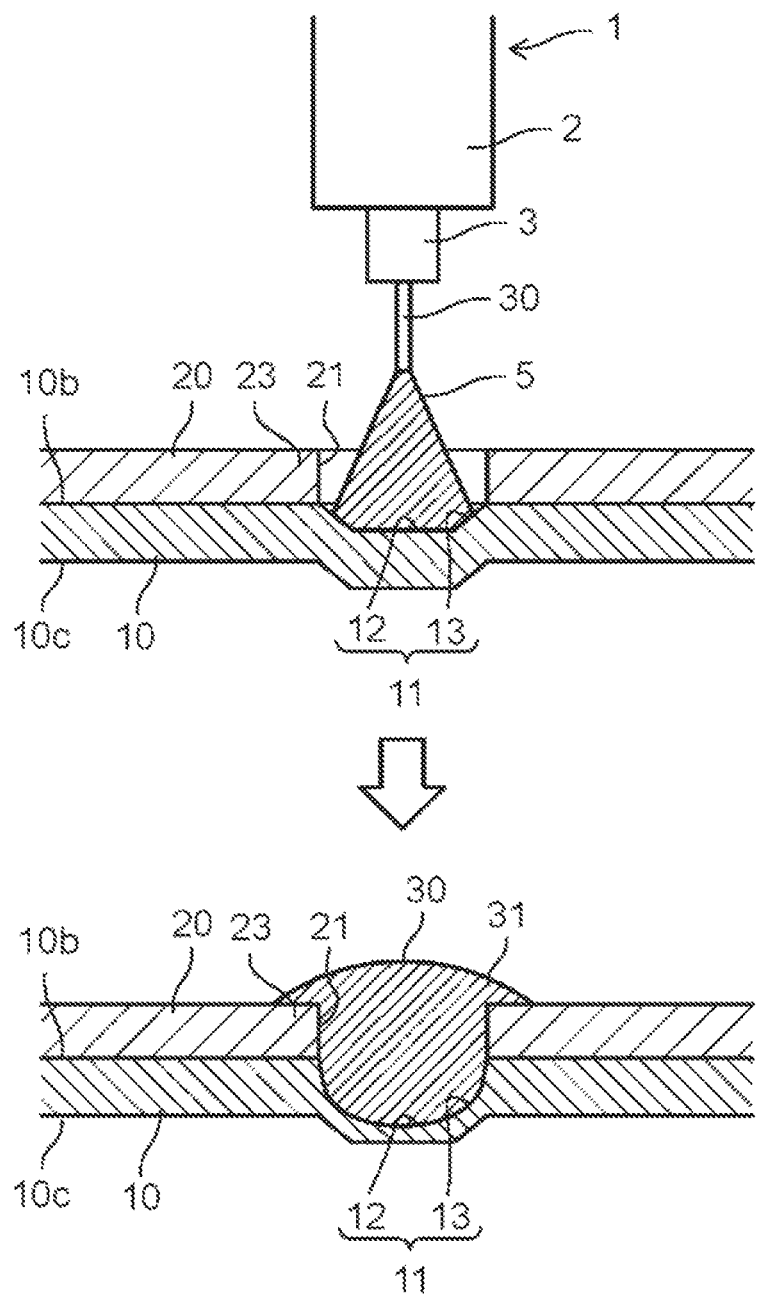
FIG. 3 is a side sectional view for describing a joining structure according to a third exemplary embodiment.

As illustrated in FIG. 3, first member 10 includes recess 11 formed by press molding. Recess 11 has bottom 12 having a flat shape and inclined part 13 inclined toward bottom 12.

Second member 20 includes penetrating part 21 that opens at a position corresponding to recess 11 of first member 10.

Third member 30 is melted by arc 5. Third member 30 having been melted flows along inclined part 13 of recess 11 toward bottom 12, and is melt-bonded to recess 11.

Then, after filling the inside of penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, recess 11 is provided with inclined part 13, and thus third member 30 having been melted easily flows toward bottom 12 of recess 11. Further, by making bottom 12 of recess 11 flat, the welding area of third member 30 can be increased to secure the joining strength.

Fourth Exemplary Embodiment

Figure 4:
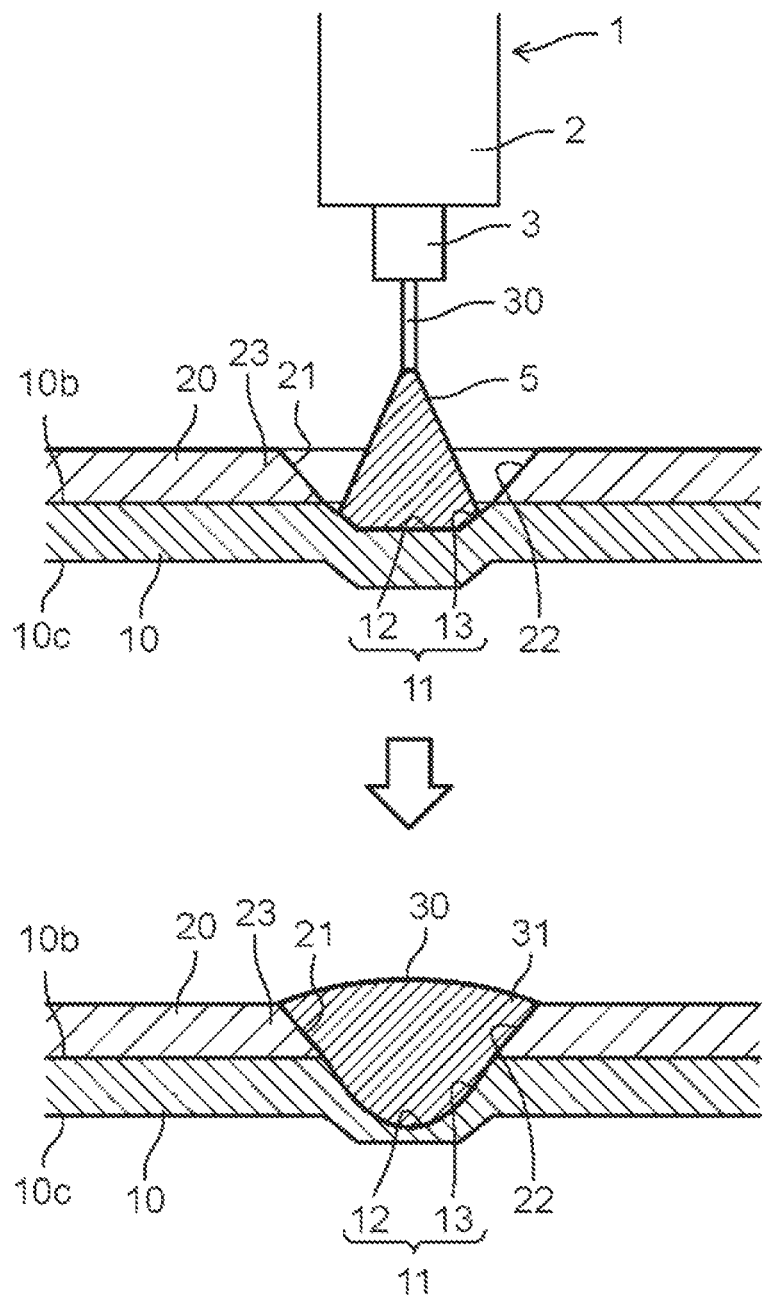
FIG. 4 is a side sectional view for describing a joining structure according to a fourth exemplary embodiment.

As illustrated in FIG. 4, first member 10 includes recess 11 formed by press molding. Recess 11 has bottom 12 having a flat shape and inclined part 13 inclined toward bottom 12.

Second member 20 includes penetrating part 21 that opens at a position corresponding to recess 11 of first member 10. Penetrating part 21 is defined by peripheral edge 23. Peripheral edge 23 includes tapered part 22 tapered toward first member 10.

Third member 30 is melted by arc 5. Third member 30 having been melted flows toward bottom 12 along tapered part 22 of peripheral edge 23 and inclined part 13 of recess 11, and is melt-bonded to recess 11.

Third member 30 having been melted fills the inside of penetrating part 21 to spread in a flange shape on an upper surface of tapered part 22.

In a process in which third member 30 having been melted becomes bead, third member 30 is provided with flange 31 that presses tapered part 22.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, by forming flange 31 in a shape along tapered part 22, the thickness of flange 31 protruding from second member 20 can be suppressed.

Further, inclined part 13 provided in recess 11 allows third member 30 having been melted to easily flow toward bottom 12 of recess 11. Further, by making bottom 12 of recess 11 flat, the welding area of third member 30 can be increased to secure the joining strength.

Fifth Exemplary Embodiment

Figure 5:
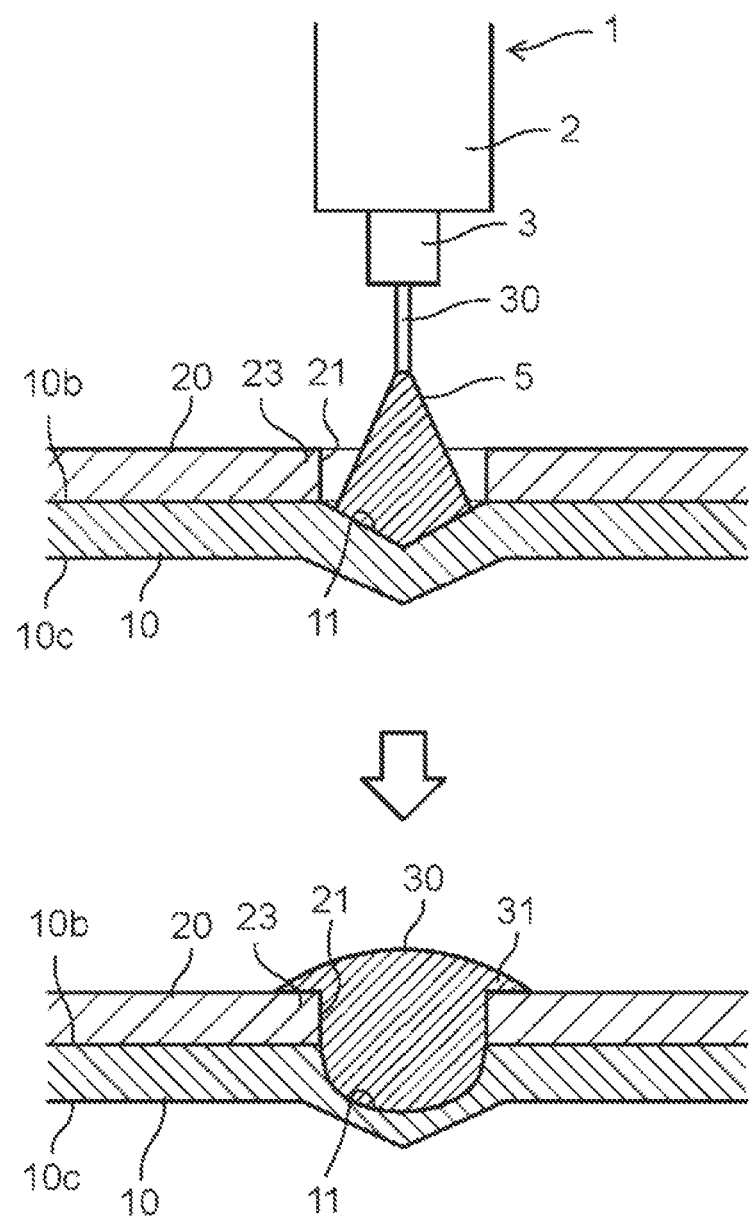
FIG. 5 is a side sectional view for describing a joining structure according to a fifth exemplary embodiment.

As illustrated in FIG. 5, first member 10 includes recess 11 formed by press molding. Recess 11 has a tapered shape tapered toward the bottom of recess 11.

Second member 20 includes penetrating part 21 that opens at a position corresponding to recess 11 of first member 10.

Third member 30 is melted by arc 5. Third member 30 having been melted flows toward the bottom of recess 11 along the tapered shape of recess 11, and is melt-bonded to recess 11.

Then, after filling the inside of penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, recess 11 having a tapered shape tapered toward the bottom allows third member 30 having been melted to easily flow toward the bottom of recess 11.

Sixth Exemplary Embodiment

Figure 6:
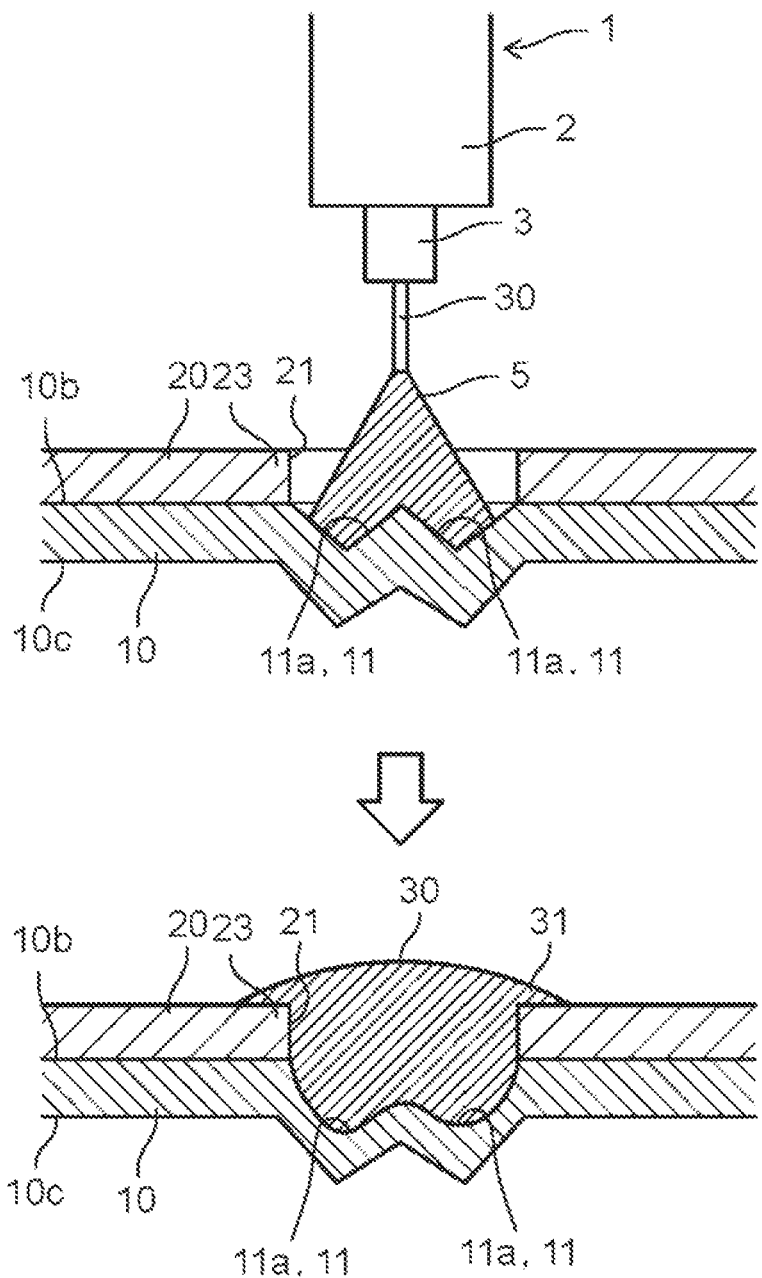
FIG. 6 is a side sectional view for describing a joining structure according to a sixth exemplary embodiment.

As illustrated in FIG. 6, recess 11 may include a plurality of small recesses 11a. First member 10 includes the plurality of small recesses 11a formed by press molding. Each of the plurality of small recesses 11a has a tapered shape tapered toward a bottom of each small recess 11a.

Second member 20 includes one penetrating part 21 that opens at a position corresponding to the plurality of small recesses 11a of first member 10.

Third member 30 is melted by arc 5. Third member 30 having been melted flows toward each bottom of small recesses 11a along a tapered shape of small recesses 11a, is dispersed in the plurality of small recesses 11a, and is melt-bonded to each small recess 11a.

Then, after filling the inside of penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, the plurality of small recesses 11 is provided, and thus third member 30 having been melted can be welded while dispersed in the plurality of small recesses 11. Further, third member 30 bites into the plurality of small recesses 11, and thus a wedge effect can be obtained in the plurality of small recesses 11 to improve joining stability.

Seventh Exemplary Embodiment

Figure 7:
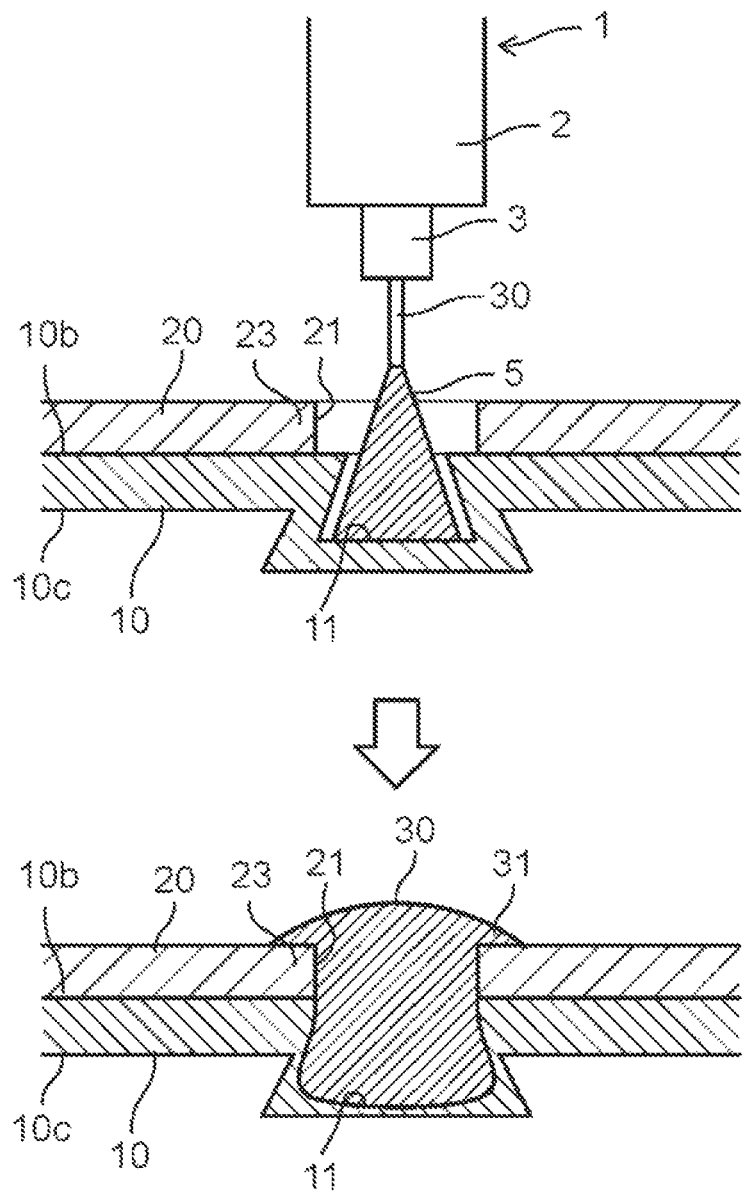
FIG. 7 is a side sectional view for describing a joining structure according to a seventh exemplary embodiment.

As illustrated in FIG. 7, first member 10 includes recess 11 formed by press molding. Recess 11 has a tapered shape that widens toward the bottom of the recess 11.

Second member 20 includes penetrating part 21 that opens at a position corresponding to recess 11 of first member 10.

Third member 30 is melted by arc 5. Third member 30 having been melted is melt-bonded to recess 11.

Then, after filling the inside of penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, recess 11 has a tapered shape that widens toward the bottom. As a result, when third member 30 having been melted is solidified in a wide portion of recess 11, third member 30 bites into recess 11, and the joining strength can be increased.

Figure 8A:
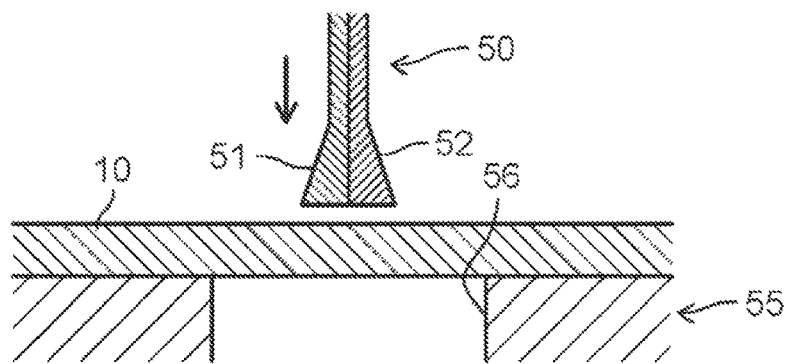
FIG. 8A is a side sectional view illustrating a state before an upper mold is pressed against a first member.

FIGS. 8A to 8D are views illustrating a procedure of forming recess 11 of first member 10 illustrated in FIG. 7 by press molding. First, as shown in FIG. 8A, first member 10 having a flat plate shape is placed on lower mold 55, and upper mold 50 is pressed. Upper mold 50 is configured to be separable into first mold 51 and second mold 52. A lower end of upper mold 50 has a tapered shape that widens downward. Drawing hole 56 corresponding to recess 11 is formed in lower mold 55.

Figure 8B:
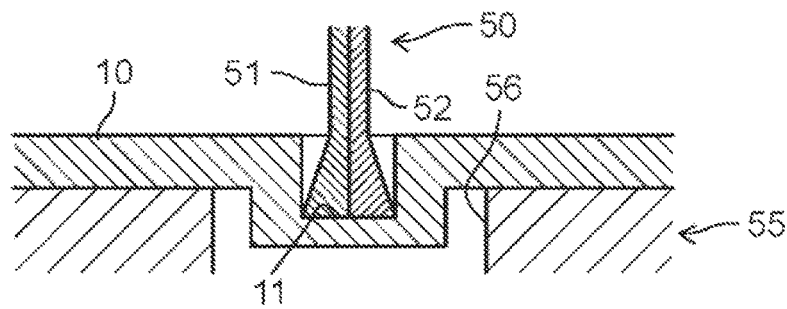
FIG. 8B is a side sectional view illustrating a state after the upper mold is pressed against the first member.

As illustrated in FIG. 8B, when upper mold 50 is pressed against first member 10, first member 10 is recessed along a shape of upper mold 50 to form recess 11.

Figure 8C:
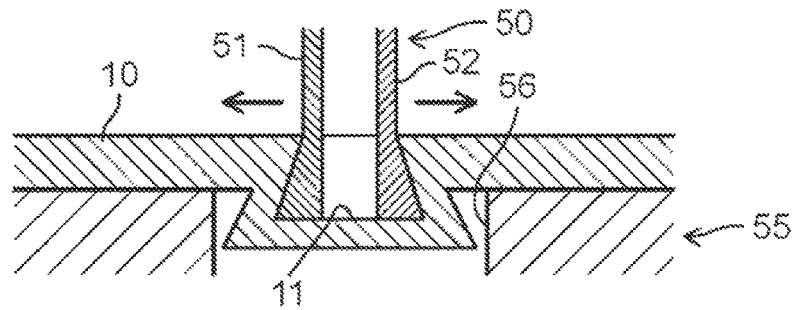
FIG. 8C is a side sectional view illustrating a state in which the upper mold is opened in a left-right direction to form a recess.

As illustrated in FIG. 8C, by opening first mold 51 and second mold 52 of upper mold 50 in a left-right direction, a side wall surface of recess 11 of first member 10 is transformed along the tapered shape of the lower end of upper mold 50. As a result, recess 11 has a tapered shape that widens toward the bottom of recess 11.

Figure 8D:
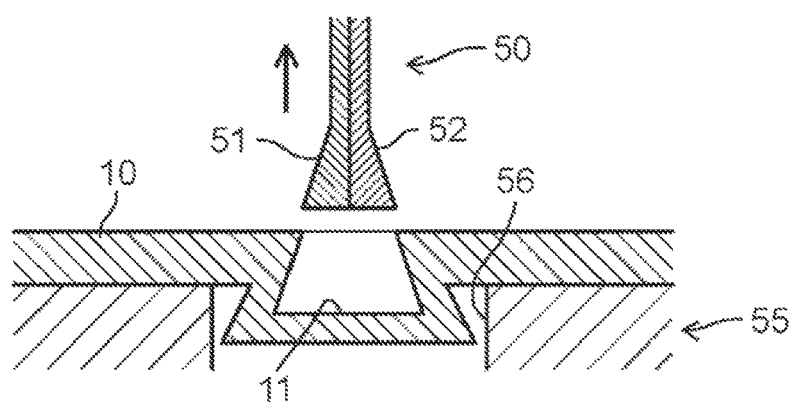
FIG. 8D is a side sectional view illustrating a state in which the upper mold is pulled up from the recess of the first member.

As illustrated in FIG. 8D, first mold 51 and second mold 52 are closed, upper mold 50 is pulled up from recess 11, and thus the press molding is completed.

Eighth Exemplary Embodiment

As illustrated in FIG. 9, first member 10 includes recess 11 formed by press molding. Recess 11 is recessed downward in a curved shape.

Second member 20 includes penetrating part 21 that opens at a position corresponding to recess 11 of first member 10.

Third member 30 is melted by arc 5. Third member 30 having been melted is melt-bonded to recess 11.

At this time, third member 30 having been melted is supplied to peripheral edge 23 by turning nozzle 2 of arc welder 1 along peripheral edge 23. As a result, third member 30 having been melted fills the inside of penetrating part 21 and spreads in a flange shape on peripheral edge 23 on the upper surface of second member 20.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, nozzle 2 of arc welder 1 is turned, and peripheral edge 23 of penetrating part 21 is arc-welded in a spiral trajectory by AC welding or short circuit welding with low heat input, and thus flange 31 can be formed while suppressing heat input.

Ninth Exemplary Embodiment

Figure 10:
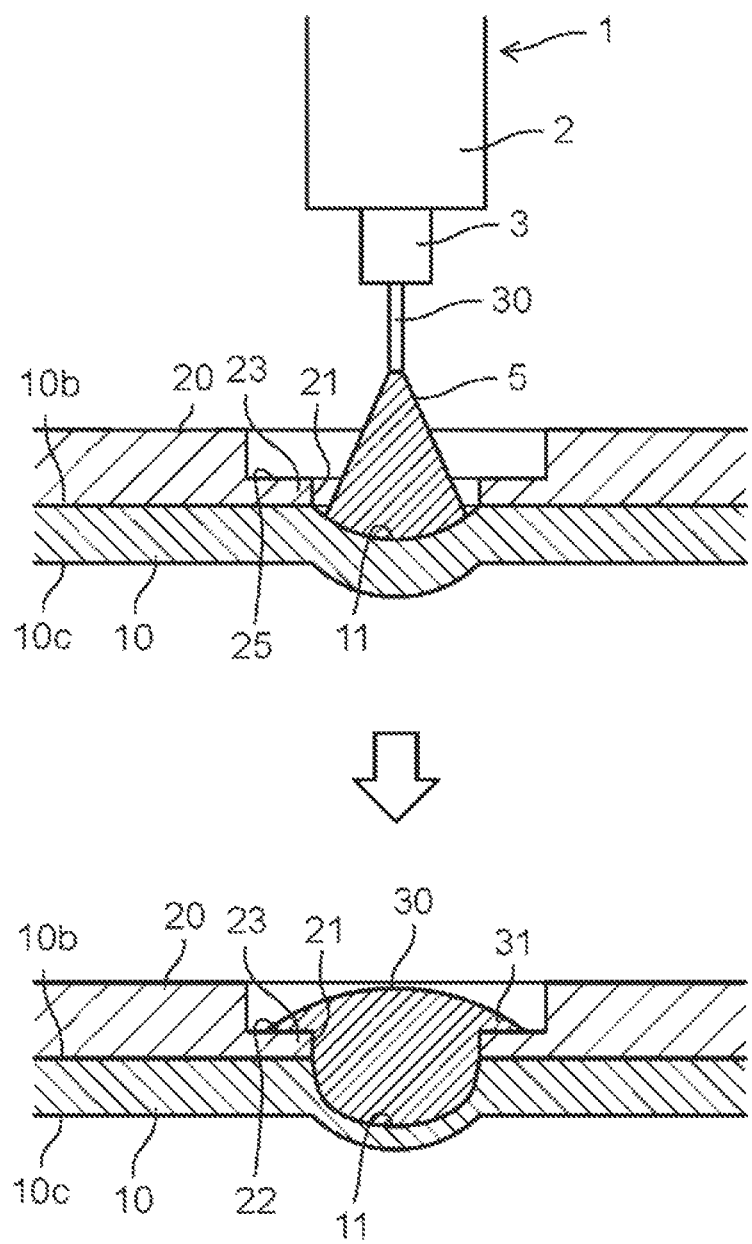
FIG. 10 is a side sectional view for describing a joining structure according to a ninth exemplary embodiment.

As illustrated in FIG. 10, first member 10 includes recess 11 formed by press molding. Recess 11 is recessed downward in a curved shape.

Second member 20 includes step 25 that opens at a surface opposite to first member 10 (upper surface in FIG. 10), and penetrating part 21 formed on a bottom surface of step 25. Penetrating part 21 is opened at a position corresponding to recess 11 of first member 10.

Third member 30 is melted by arc 5. Third member 30 having been melted is melt-bonded to recess 11.

Then, after filling the inside of penetrating part 21, third member 30 having been melted flows out to peripheral edge 23 on the upper surface of second member 20, that is, the bottom surface of step 25, and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, flange 31 of third member 30 is disposed in step 25, and thus flange 31 can be prevented from protruding from second member 20.

Tenth Exemplary Embodiment

Figure 11:
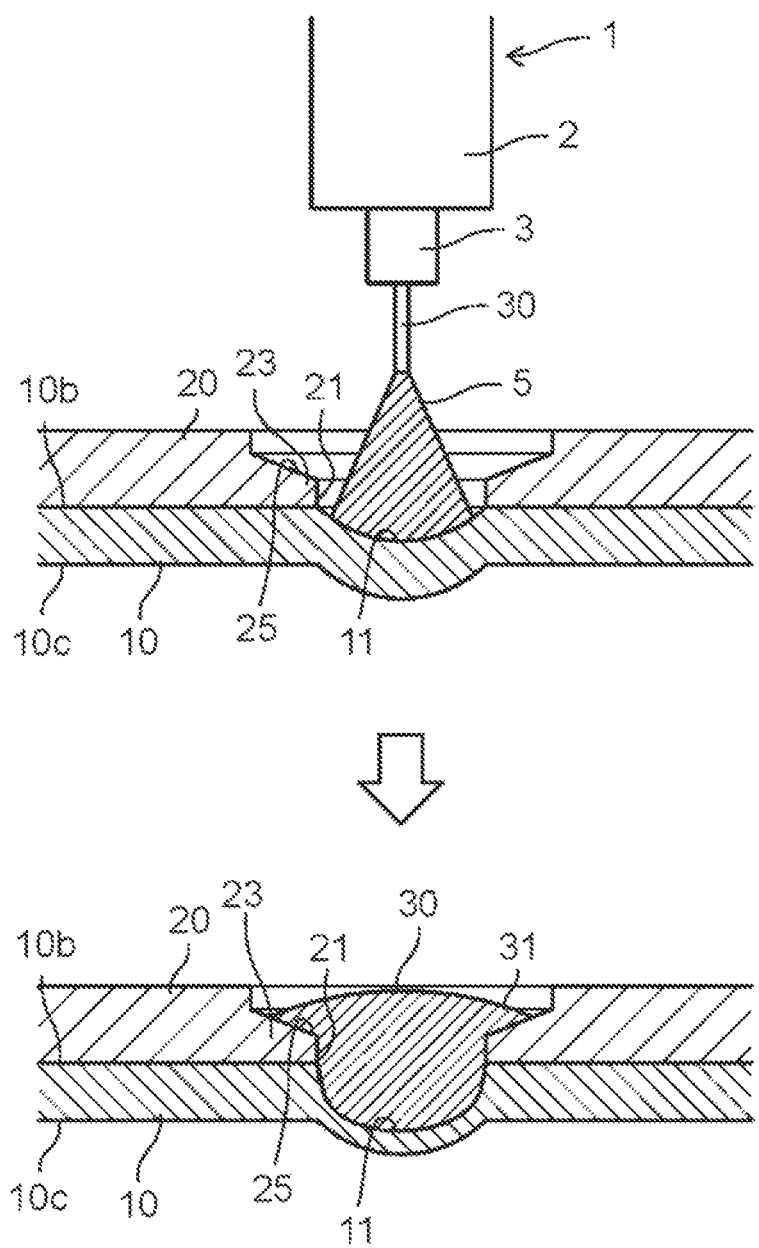
FIG. 11 is a side sectional view for describing a joining structure according to a tenth exemplary embodiment.

As illustrated in FIG. 11, first member 10 includes recess 11 formed by press molding. Recess 11 is recessed downward in a curved shape.

Second member 20 includes step 25 that opens at the surface opposite to first member 10 (upper surface in FIG. 11), and penetrating part 21 formed on the bottom surface of step 25. The bottom surface of step 25 is inclined toward penetrating part 21. Penetrating part 21 is opened at a position corresponding to recess 11 of first member 10.

Third member 30 is melted by arc 5. Third member 30 having been melt flows toward penetrating part 21 along an inclined surface of step 25, and is then melt-bonded to recess 11.

Then, after filling the inside of penetrating part 21, third member 30 having been melted flows out to peripheral edge 23 on the upper surface of second member 20, that is, the bottom surface of step 25, and spreads on the inclined surface of step 25 in a flange shape.

In a process in which third member 30 having been melted becomes bead, third member 30 is provided with flange 31 that presses the inclined surface of step 25.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, the bottom surface of step 25 is inclined toward penetrating part 21, and thus third member 30 having been melted easily flows toward penetrating part 21. Further, flange 31 of third member 30 is disposed in step 25, and thus flange 31 can be prevented from protruding from second member 20.

Eleventh Exemplary Embodiment

Figure 12:
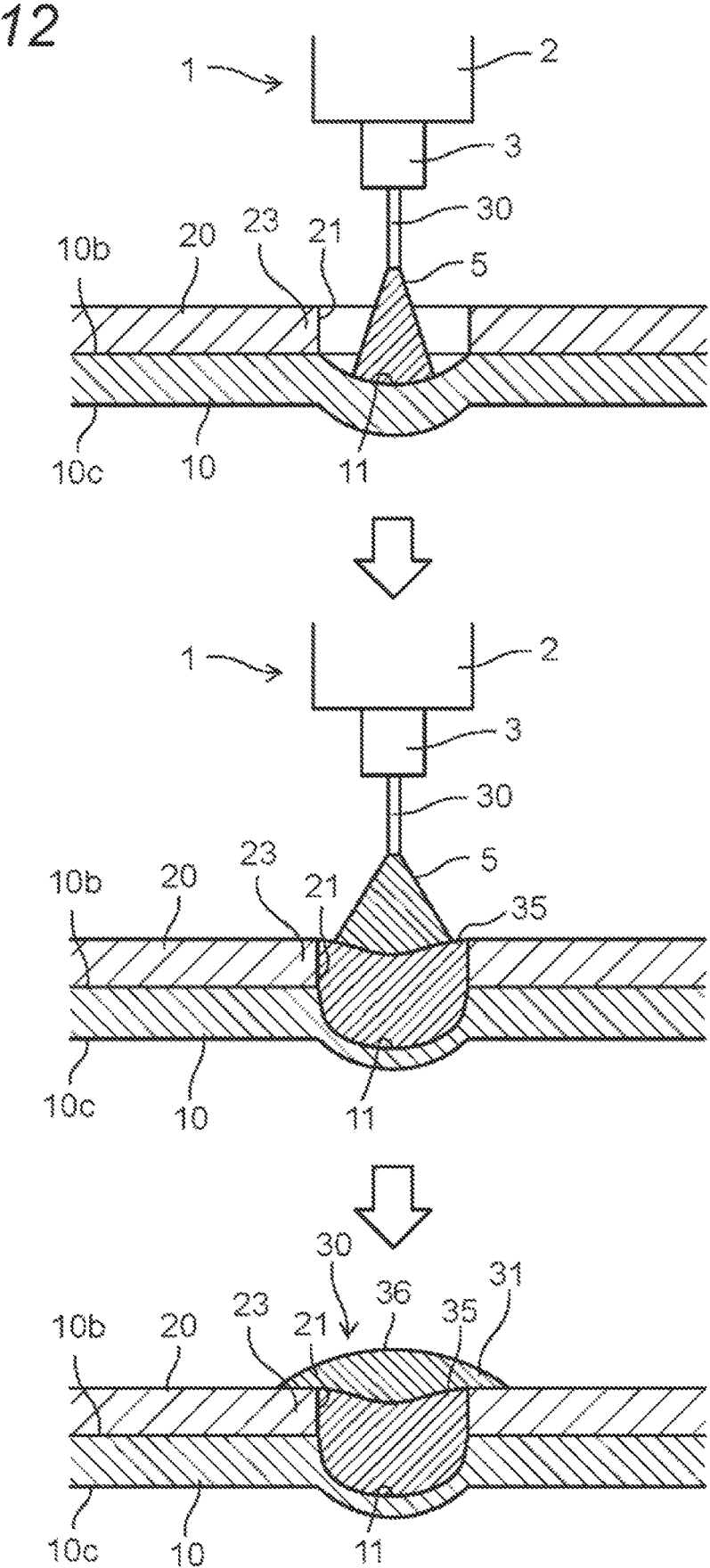
FIG. 12 is a side sectional view for describing a joining structure according to an eleventh exemplary embodiment.

As illustrated in FIG. 12, first member 10 includes recess 11 formed by press molding. Recess 11 is recessed downward in a curved shape.

Second member 20 includes penetrating part 21 that opens at a position corresponding to recess 11 of first member 10.

Third member 30 is melted by arc 5. Third member 30 includes first joint 35 welded to first member 10 and second joint 36 welded to first joint 35 and constituting flange 31.

Specifically, when third member 30 having been melted is welded to first member 10 via penetrating part 21, short circuit welding in which spread of arc 5 is small is performed with heat input necessary for melting to form first joint 35 having a recessed upper center. Thereafter, pulse welding with positive polarity or alternating current in which arc 5 spreads largely is performed with such a low heat input not to melt second member 20, and third member 30 having been melted spreads along the recessed shape of the upper center of first joint 35 to form second joint 36. As a result, flange 31 can be formed while suppressing heat input amount to second member 20.

In a process in which third member 30 having been melted becomes bead, third member 30 is provided with first joint 35 and second joint 36. First joint 35 is melt-bonded to recess 11 of first member 10. Second joint 36 is melt-bonded to first joint 35 to constitute flange 31 pressing peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, third member 30 is formed separately into first joint 35 and second joint 36, and it is therefore possible to selectively use a welding method or a welding condition in consideration of material characteristics of second member 20.

Twelfth Exemplary Embodiment

Figure 13:
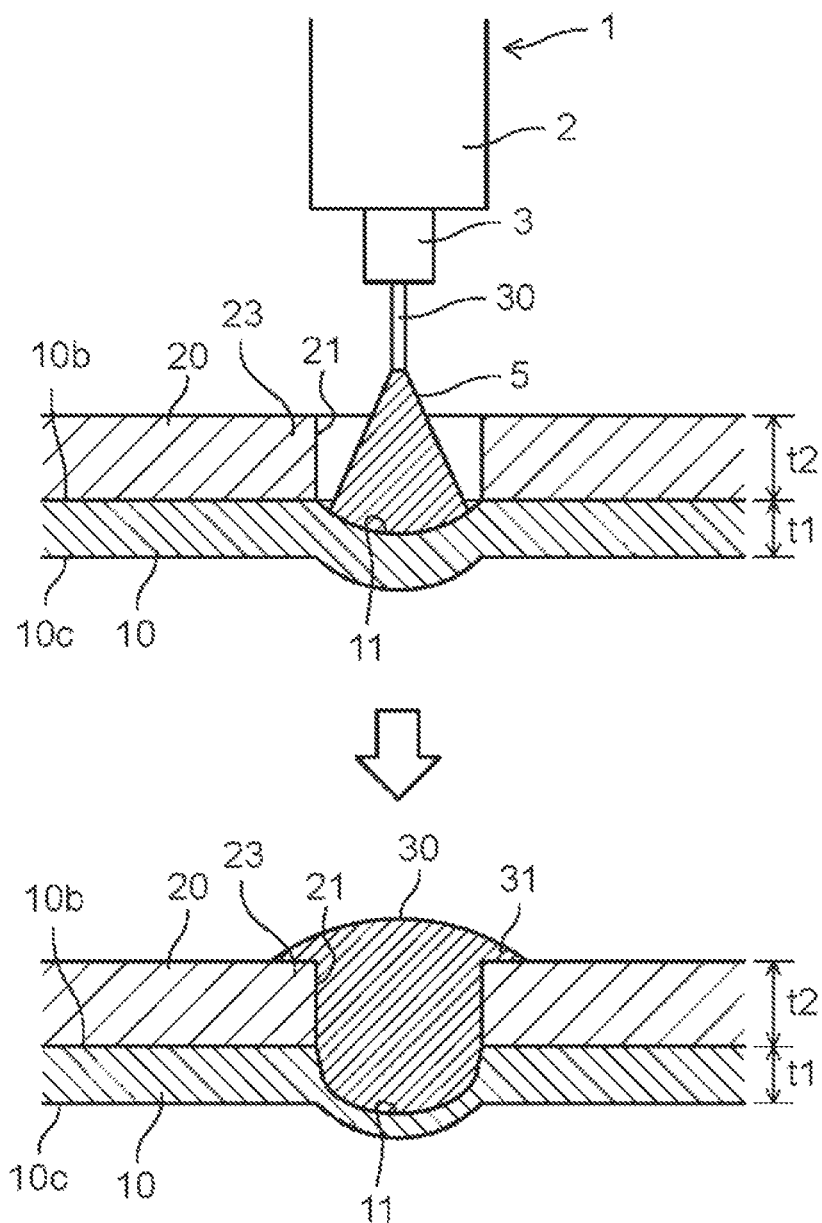
FIG. 13 is a side sectional view for describing a joining structure according to a twelfth exemplary embodiment.

In an example illustrated in FIG. 13, a soft steel material is used as first member 10, an aluminum material is used as second member 20, and a soft steel material is used as third member 30 serving as a filler material. Second member 20 therefore has a melting point lower than a melting point of first member 10.

Thus, plate thickness t2 of second member 20 is larger than plate thickness t1 of first member 10 to increase relative heat capacity.

Specifically, when the thickness of second member 20 is small, the heat capacity is reduced, and heat generated by welding has fewer places to escape and is likely to accumulate. On the other hand, when the thickness of second member 20 is large, the heat capacity increases, and the heat has more places to escape and is less likely to accumulate. In this way, by increasing the thickness of second member 20, second member 20 is less likely to burn through.

It is sufficient that a ratio of plate thickness t1 of first member 10 and plate thickness t2 of second member 20 is set to 1:1 or more, and preferably 1:1.5 or more. It is therefore possible to prevent second member 20 from burning through and to join dissimilar materials.

Other Exemplary Embodiments

The above exemplary embodiments may have the following configuration.

In the present exemplary embodiment, arc welding is performed on recess 11 of first member 10, but for example, laser filler welding may be performed.

Further, the combination of the shape of recess 11 of first member 10 and the shape of penetrating part 21 of second member 20 described in the present exemplary embodiment is merely an example, and other combinations may be adopted.

INDUSTRIAL APPLICABILITY

As described above, the present invention is significantly useful and has high industrial applicability because it is possible to obtain a highly practical effect that the welding area of the filler material can be increased to secure the joining strength.

REFERENCE MARKS IN THE DRAWINGS 10 first member
11 recess
12 bottom
13 inclined part
20 second member
21 penetrating part
22 tapered part
23 peripheral edge
25 step
30 third member
31 flange
35 first joint
36 second joint

The invention claimed is:

1. A joining structure joining, to each other, a first member including a metal material, a second member including a material that is different from the metal material of the first member, and a third member including a filler material welded to the first member, wherein
the first member includes a recess and has a lower surface opposite to the second member, the lower surface being configured to protrude,
the second member includes a penetrating part that extends a full thickness of the second member and opens at a position corresponding to the recess,
the third member includes a flange that presses a peripheral edge of the penetrating part, and is arc-welded toward at least a bottom of the recess via the penetrating part, and
the second member is compressed by the flange and the first member by solidification contraction of the third member, and thus the second member is fixed between the flange and the first member.

2. The joining structure according to claim 1, wherein the penetrating part is defined by the peripheral edge,
the peripheral edge includes a tapered part tapered toward the first member, and
the flange presses the tapered part.

3. The joining structure according to claim 1, wherein the recess includes a bottom having a flat shape and an inclined part inclined toward the bottom.

4. The joining structure according to claim 1, wherein the recess has a tapered shape that widens toward the bottom of the recess.

5. The joining structure according to claim 1, wherein the recess includes a plurality of small recesses smaller than the recess.

6. The joining structure according to claim 1, wherein
the second member further includes a step that opens at a surface opposite to the first member, and
the penetrating part extends through a bottom surface of the step.

7. The joining structure according to claim 6, wherein the bottom surface of the step is inclined toward the penetrating part.

8. The joining structure according to claim 1, wherein the third member includes a first joint welded to the first member and a second joint welded to the first joint and constituting the flange.

9. The joining structure according to claim 1, wherein the second member has a melting point lower than a melting point of the first member and has a thickness larger than a thickness of the first member.

10. A joining structure joining, to each other, a first member including a metal material, a second member including a material that is different from the metal material of the first member, and a third member including a filler material welded to the first member, wherein
the first member includes a recess and has a lower surface opposite to the second member, the lower surface being configured to protrude,
the second member includes a penetrating part that opens at a position corresponding to the recess,
the third member includes a flange that presses a peripheral edge of the penetrating part, and is arc-welded toward at least a bottom of the recess via the penetrating part,
the second member is compressed by the flange and the first member by solidification contraction of the third member, and thus the second member is fixed between the flange and the first member, and
the flange protrudes radially outward from the penetrating part on a surface of the second member opposite to the first member.

11. The joining structure according to claim 10, wherein the recess includes a bottom having a flat shape and an inclined part inclined toward the bottom.

12. A joining structure joining, to each other, a first member including a metal material, a second member including a material that is different from the metal material of the first member, and a third member including a filler material welded to the first member, wherein
the first member includes a recess and has a lower surface opposite to the second member, the lower surface being configured to protrude,
the second member includes a penetrating part that opens at a position corresponding to the recess,
the third member includes a flange that presses a peripheral edge of the penetrating part, and is arc-welded toward at least a bottom of the recess via the penetrating part,
the second member is compressed by the flange and the first member by solidification contraction of the third member, and thus the second member is fixed between the flange and the first member, and
the recess has a tapered shape tapered toward the bottom of the recess.

13. The joining structure according to claim 12, wherein the recess includes a bottom having a flat shape and an inclined part inclined toward the bottom.

14. A joining structure joining, to each other, a first member including a metal material, a second member including a material that is different from the metal material of the first member, and a third member including a filler material welded to the first member, wherein
- the first member includes a recess and has a lower surface opposite to the second member, the lower surface being configured to protrude,
- the second member includes a penetrating part that opens at a position corresponding to the recess,
- the third member includes a flange that presses a peripheral edge of the penetrating part, and is arc-welded toward at least a bottom of the recess via the penetrating part, and
- the second member is compressed by the flange and the first member by solidification contraction of the third member, and thus the second member is sandwiched between the flange and the first member, and is in contact with the first member and the third member.

15. The joining structure according to claim 14, wherein the recess includes a bottom having a flat shape and an inclined part inclined toward the bottom.

* * * * *